United States Patent [19]

Ricketts et al.

[11] Patent Number: 4,876,888
[45] Date of Patent: Oct. 31, 1989

[54] THICKNESS MONITOR FOR FLOATED SLUDGE

[76] Inventors: John Ricketts; George M. Grecu, both of P.O. Box 147, Columbia, S.C. 29217

[21] Appl. No.: 272,425

[22] Filed: Nov. 17, 1988

[51] Int. Cl.⁴ .................... G01F 23/30; G01F 23/76
[52] U.S. Cl. ........................... 73/319; 73/314; 73/322.5; 73/305; 210/86; 210/121; 210/128; 210/608; 210/744
[58] Field of Search ............... 73/305, 306, 291, 314, 73/319, 322, 321, 322.5; 210/86, 121, 128, 739, 740, 744, 608; D22/145, 146

[56] References Cited

U.S. PATENT DOCUMENTS

| | | | |
|---|---|---|---|
| D. 252,284 | 7/1979 | Calzia et al. | D22/146 |
| 727,779 | 5/1903 | Frieseke | 73/322 |
| 924,398 | 6/1909 | Stevens | 73/322.5 |
| 1,270,655 | 6/1918 | Page | 73/321 |
| 1,313,373 | 8/1919 | Ellis | 73/322.5 |
| 1,554,775 | 9/1925 | Ayling | 73/322 |
| 1,577,145 | 3/1926 | Osborn | 73/322.5 |
| 1,629,758 | 5/1927 | Wilson | 73/321 |
| 1,741,792 | 12/1929 | Rinehart | 73/321 |
| 1,982,961 | 12/1934 | Marsh | 210/740 |
| 2,526,784 | 10/1950 | Walker | 73/319 |
| 2,807,960 | 10/1957 | Schweitzer | 73/322 |
| 2,834,211 | 5/1958 | Samaritano | 73/322 |
| 2,850,439 | 9/1958 | Bodkin | 210/744 |
| 2,908,101 | 10/1959 | Butler et al. | D22/146 |
| 2,942,468 | 6/1960 | Lelug | 73/321 |
| 2,995,824 | 8/1961 | Wells | 73/321 |
| 3,168,790 | 2/1965 | Creasey | D22/146 |
| 3,392,582 | 7/1968 | Pick et al. | 73/322 |
| 3,572,122 | 3/1971 | Nusbaum | 73/314 |
| 3,617,544 | 11/1971 | Voss et al. | 210/121 |
| 4,116,062 | 9/1978 | Reip | 73/321 |
| 4,459,584 | 7/1984 | Clarkson | 73/321 |
| 4,709,653 | 12/1987 | Salomon | 73/321 |

FOREIGN PATENT DOCUMENTS

| | | | |
|---|---|---|---|
| 112385 | 12/1967 | Norway | 73/319 |
| 417691 | 7/1974 | U.S.S.R. | 73/321 |

Primary Examiner—William A. Cuchlinski, Jr.
Assistant Examiner—Diego F. F. Gutierrez
Attorney, Agent, or Firm—Dennison, Meserole, Pollack & Scheiner

[57] ABSTRACT

An apparatus is disclosed for determining the thickness of a layer of aerated sludge floating on a layer of heavier liquid in a tank used in the treatment of sewage. The apparatus comprises a frame which can be positioned to extend vertically into the tank, an indicator supported by and movable vertically with respect to the frame, the indicator being positionable at the highest level of sludge in the tank, a horizontally-extending lower base attached to the frame at or near the bottom thereof, a horizontally-extending upper base attached to the frame at or near the top thereof, and a line carrying a float, the line being movably secured at the upper and lower base. The float is movable between the upper and lower base, is floatable on the liquid, and includes a horizontally extending portion presenting an upwardly directed, generally planar surface. This surface will be substantially parallel to the interface of the sludge and liquid, and if the float is located below the sludge layer, the flat surface will cause the upward rise of the float to be impeded when it hits the sludge layer.

12 Claims, 3 Drawing Sheets

U.S. Patent  Oct. 31, 1989  Sheet 1 of 3  4,876,888
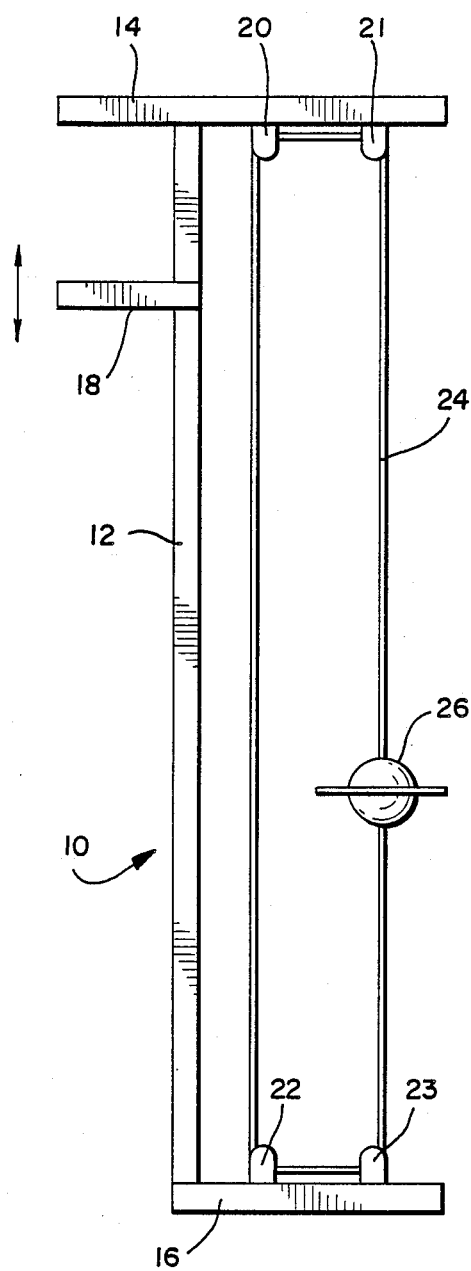
FIG. 1
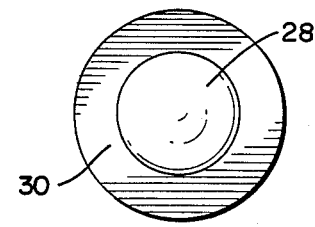
FIG. 2
FIG. 3
FIG. 4
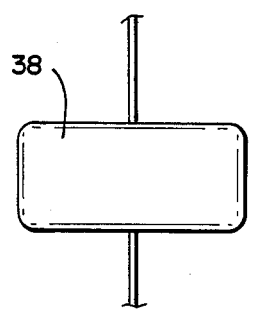
FIG. 5

THICKNESS MONITOR FOR FLOATED SLUDGE

BACKGROUND OF THE INVENTION

This invention relates to the field of sewage treatment.

In the treatment of sewage, it is standard practice to initially strain the sewage to remove coarse materials and large objects, followed by transfer of the sewage to a settling basin, where sand is allowed to settle out.

The sewage is then transferred to a primary basin forming a thickened or "heavy" settled sludge. The settled sludge is pumped to air flotation basins where it separates from and floats on top of a heavier layer which contains mostly water with a very small (less than 1%) amount of solids. The thickened sludge layer contains greater than 2% by weight, and generally from 5.5 to 7% by weight solids, in addition to water and air. Because this sludge contains a very large amount of air, its density is generally only in the range of about 0.06 to 0.1 grams per ml.

The thickened sludge layer which generally forms to a depth of 24 to 36 inches, is skimmed off by raking, and is subsequently digested and incinerated. The liquid layer in the primary basin is removed and subjected to a biological treatment to form activated sludge which is mixed with the raw sewage entering the treatment cycle.

In the treatment process, it is very important to know the thickness of the sludge in the air flotation basin, in order to operate the process at its maximum efficiency. If the thickness of the sludge becomes too great, it is necessary either to increase the time of operation of the rakes removing the sludge, or to slow down the entry of the sludge into the primary basin. The sludge, however, is a very difficult material to work with. The sludge is of variable consistency, smells bad and presents a health hazard since its bacterial levels are so high. It cannot be determined by looking from above what the actual thickness of the sludge layer is.

U.S. Pat. No. 3,923,655 discloses a system for detecting the level of sludge in a sedimentation tank in which a heavy sludge layer settles to the bottom, below a lighter liquid layer. According to this method, a series of temperature indicating devices are disposed in the tank, these devices indicating a temperature differential between the sludge and the liquid.

U.S. Pat. No. 4,436,630 discloses an apparatus and method for separating a mixture of two liquids of different densities utilizing a series of floats disposed at different levels in a tank. The two lower floats are filled with the anticipated less dense liquid or otherwise pre-weighted to a predetermined specific gravity.

SUMMARY OF THE INVENTION

It is an object of the present invention to measure the thickness of a sludge layer simply and quickly.

It is another object of the present invention to measure the thickness of a sludge layer utilizing a device which is operational regardless of the exact consistency and density of the sludge.

To achieve these and other objects, the present invention provides an apparatus for determining the thickness of a layer of aerated sludge floating on a layer of heavier liquid in a tank, comprising a frame which can be positioned to extend vertically into the tank, a float which is floatable on the liquid and which includes a horizontally-extending portion presenting an upwardly directed, generally planar surface parallel to the interface of the liquid and sludge, means for tethering the float for vertical movement with respect to the frame, and means for determining when the upward movement of the float is impeded and determining the depth of the float when impeded.

In a preferred embodiment, the apparatus comprises:
(a) a frame which can be positioned to extend vertically into the tank;
(b) an indicator supported by and movable vertically with respect to the frame, the indicator being positionable at the highest level of sludge in the tank;
(c) a horizontally-extending lower base attached to the frame at or near the bottom thereof;
(d) a horizontally-extending upper base attached to the frame at or near the top thereof; and
(e) a line carrying a float, the line being movably secured at the upper base and the lower base, such that the float is movable between the upper and lower base, the float being floatable on the liquid and including a horizontally-extending portion presenting an upwardly directed generally planar surface parallel to the interface of the sludge and liquid.

The present invention also includes a method for determining the thickness of a layer of aerated sludge floating on a layer of heavier liquid in a tank, comprising the steps of determining the highest level of sludge in the tank, lowering below the sludge layer a float which is floatable on the liquid and includes a horizontally-extending portion presenting a generally planar surface parallel to the interface of the sludge and liquid, allowing the float to rise to the interface of the sludge and liquid where its upward progress is substantially impeded, and determining the distance between the float at the point at which its progress is impeded and the highest sludge level in the tank.

BRIEF DESCRIPTION OF THE DRAWINGS

FIG. 1 is a side perspective view of an apparatus according to the invention;

FIG. 2 is a side perspective view of a first float according to the invention;

FIG. 3 is a top perspective view of the float of FIG. 2;

FIG. 4 is a side perspective view of a second float according to the invention;

FIG. 5 is a side perspective view of a third float according to the invention;

DESCRIPTION OF THE PREFERRED EMBODIMENTS

Figure 6:
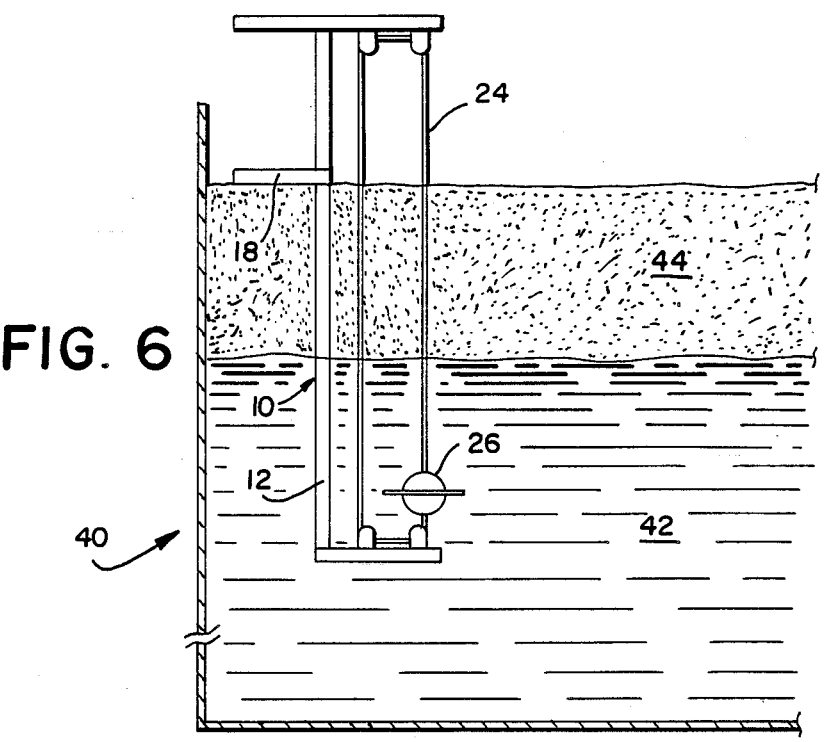
FIG. 6 is a cross-sectional view of a sludge tank including the apparatus of the invention in an initial position.

Shown in FIG. 1 is a basic apparatus 10 according to the invention. The apparatus comprises a frame 12 having an upper base 14, which also serves as a handle, and a lower base 16. An indicator 18 is slidable vertically along the frame 12 in the direction of the arrow and can be positioned at any point along the frame by conventional means. Two loops 20 and 21 are positioned on the upper base facing downwardly, and two loops 22 and 23 are positioned on the lower base facing upwardly. A continuous line 24 is strung through the loops and along line 24 is fixed a float 26. While line 24 is secured by loops 20, 21, 22 and 23, the line is movable through the loops so that float 26 can move up and down between loops 21 and 23.

The frame and bases can be constructed of any suitable material, and in practice, copper pipe can be used. With an approximate sludge depth of 2 to 3 feet, the overall height of the apparatus would generally be in the range of 7 to 10 feet, although overall height is not critical. The line is typically a strong, smooth surfaced line. Any suitable line may be used.

The float is shown in greater detail in FIGS. 2 and 3. Float 26 is composed of two portions, a hollow sphere 28 and a ring 30 around the sphere. Sphere 28 can be any suitable type of float of a lower density than water, and a conventional toilet float is useful for this purpose. Such a float is hollow and can be constructed of metal or plastic. Around the float at its central portion is a ring 30 having generally flat faces. The size of the ring is selected in proportion to the overall size of the float and should be sufficient to present sufficient upwardly directed, generally planar surface areas so that when the ring rises through the liquid in the tank, the flat surface presents enough resistance that the upward movement of the float will be impeded when it hits the sludge layer. Thus, it is not necessary for the float itself to have a greater density than the sludge layer, the density of the sludge layer being difficult to predict. While the float itself may normally float on the sludge layer, the upward motion of the float will stop as it hits the sludge due to the flat surface of the ring.

The exact configuration of the ring may vary, as long as enough planar surface is present to impede the upward motion of the float.

Typically, the width of the ring will be approximately equal to or greater than the radius of the float. By using these proportions, the float will be suitable for use with most sludge densities.

The float need not, of course, be spherical in shape. FIG. 4 shows another float 32 having an oblong section 34 and a ring 36. In FIG. 5, the float 38 is substantially rectangular in cross-section, thereby presenting in itself a flat surface which is substantially parallel to the sludge-liquid interface.

Figure 7:
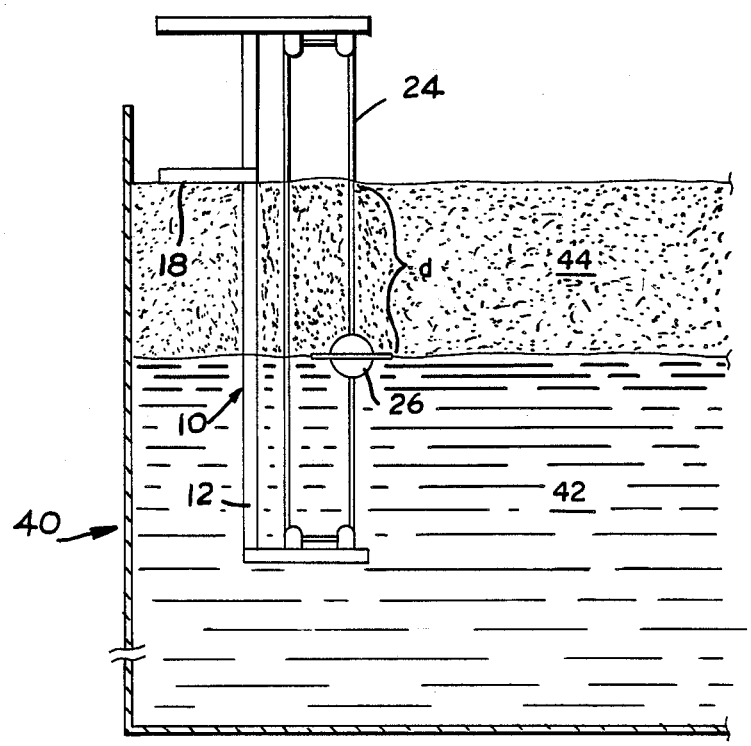
FIG. 7 is a cross-sectional view of a sludge tank including the apparatus of the invention in a second position.

Use of the apparatus of the invention is illustrated in FIGS. 6 and 7. FIGS. 6 and 7 show in cross-section a portion of a primary basin of approximate diameter 500 feet and approximate depth 100 feet. Basin 40 is filled with liquid 42 having a thickened sludge layer 44 on top thereof. Apparatus 10 is positioned in the basin and indicator 18 is adjusted along frame 12 to the upper level of the sludge. At this point, line 24 is adjusted so that float 26 is at the lowest end of its travel, shown in FIG. 6. The line is then released allowing float 26 to rise to the position shown in FIG. 7, the interface between liquid layer 42 and sludge layer 44. Due to the presence of ring 30, the travel of float 26 stops at that point. The apparatus is then removed from the tank, and the distance d between ring 30 and indicator 18 is measured; this distance d corresponds to the thickness of the sludge layer.

If float 26 is actually less dense than the sludge, the float will eventually rise to the top of the sludge layer. For this reason, distance d should be measured without substantial delay after the float stops rising.

Figure 8:
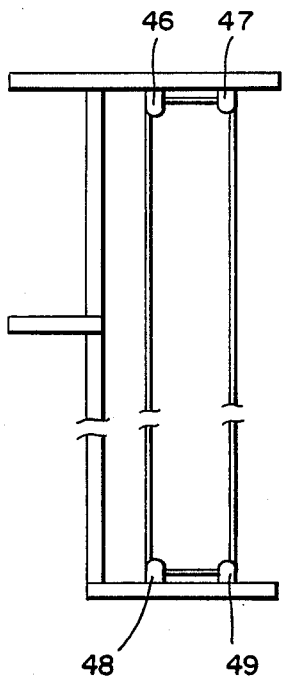
FIG. 8 is a side perspective view of a portion of an alternative apparatus according to the invention.
Figure 9:
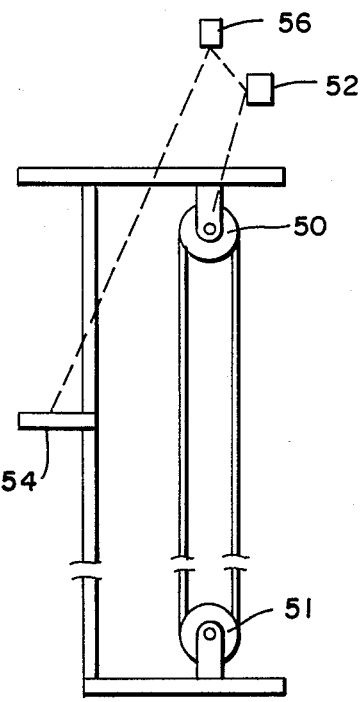
FIG. 9 is a side perspective view of a second alternative apparatus according to the invention.

Variations on the construction of the apparatus are shown in FIGS. 8 and 9. In FIG. 8, loops 20-23 have been replaced by pulleys 46, 47, 48 and 49.

In FIG. 9, a single large pulley 50 is attached to the upper base and a single large pulley 51 is attached to the lower base. The pulleys are driven automatically by a conventional drive means, such as motor means, shown schematically as 52. Drive means 52 or pulley 50, and the positionable indicator 54 are both coupled to a computing means 56. This computing means 56 can determine the highest level of the sludge in the tank and the distance of travel of the float, and thereby automatically compute the depth of sludge in the tank. If indicator 54 is designed such that it is freely floatable on the sludge layer, the apparatus can be permanently positioned in the tank, and sludge depth measurements can be read and recorded automatically at a remote location. Other means for automatically determining the highest sludge level can also be used.

Figure 10:
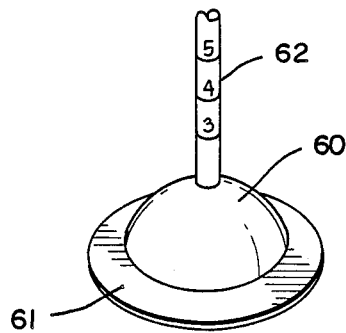
FIG. 10 is a side perspective view of a portion of an alternative float and line according to the invention.

FIG. 10 shows a float 60 attached to a calibrated line 62. Line 62 is calibrated in inches from ring 61, the float being 2 inches in radius. By observing the line at the point at which it emerges from the sludge, it can be determined the depth below the surface that the ring is located. In this case, the line itself serves as an indicator means movable vertically along the frame, and a separate indicator means is not necessary.

Other variations of the above apparatus will be apparent to those of ordinary skill in the art.

What is claimed is:

1. Apparatus for determining the thickness of a layer of aerated sludge floating on a layer of a heavier liquid in a tank, comprising:
   (a) a frame means which can be positioned to extend vertically into the tank;
   (b) horizontally-extending indicator means supported by and movable vertically with respect to a portion of said frame means extending vertically into said tank, said indicator means being selectively positionable at the highest level of sludge in the tank;
   (c) horizontally-extending lower base means attached to said frame means at or near the bottom thereof;
   (d) horizontally-extending upper base means attached to said frame means at or near the top thereof; and
   (e) a line carrying a float means, said line being movably secured at said upper base means and said lower base means, such that said float means is movable between said upper and lower base means, said float means being floatable on the liquid and including a horizontally-extending portion presenting an upwardly directed generally planar surface, which surface will be parallel to the interface of the sludge and liquid.

2. Apparatus according to claim 1, wherein said upper and lower frame means each includes a pair of loops through which said line is threaded, thereby movably securing the line.

3. Apparatus according to claim 1, wherein said upper and lower frame means each includes at least one pulley means movably securing said line.

4. Apparatus according to claim 3, additionally comprising drive means coupled to at least one pulley means for rotating said pulley means and thereby moving said line and float.

5. Apparatus according to claim 4, wherein said drive means are motor means.

6. Apparatus according to claim 1, wherein said float means comprises a central portion which is circular or spherical in vertical cross-section, and a portion which comprises a ring around the central portion, said ring presenting an upwardly directed substantially flat surface.

7. Apparatus according to claim 6, wherein the width of said ring is approximately equal to or greater than the radius of said central portion in horizontal cross-section at the location of the ring.

8. Apparatus according to claim 1, wherein said float is substantially rectangular in vertical cross-section.

9. Apparatus according to claim 1, wherein said line includes calibration markings.

10. Apparatus according to claim 9, wherein said calibration markings indicate the distance from the vertical center of the float.

11. Apparatus according to claim 7, wherein said indicator means is positionable automatically at the highest level of sludge in the tank.

12. Apparatus according to claim 11, wherein said indicator means is adapted to float on the sludge layer.

* * * * *